June 3, 1930.                L. BLACKMORE                1,761,967
                         RUBBER SPRING SHACKLE
                          Filed Feb. 20, 1928
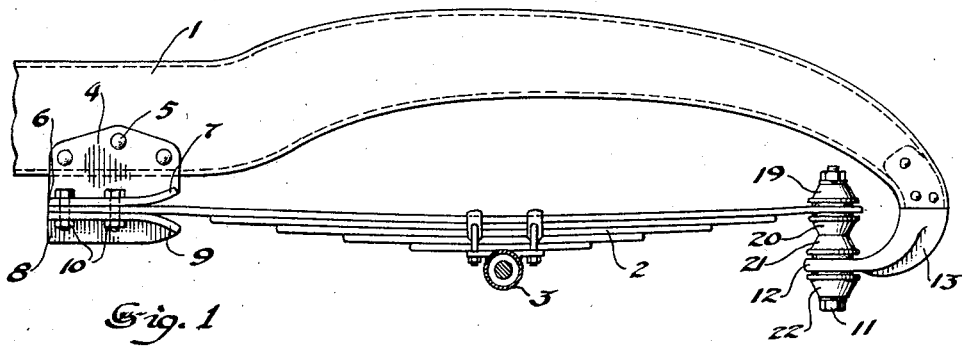
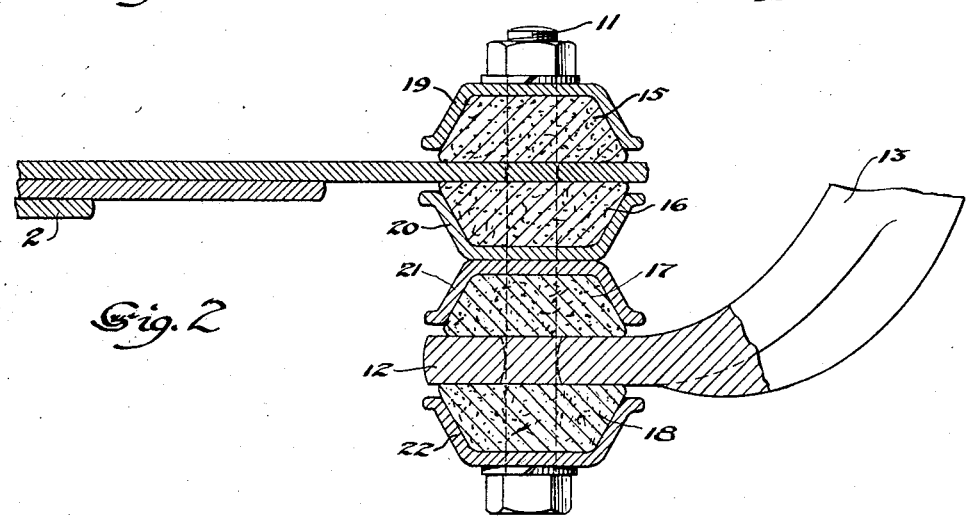
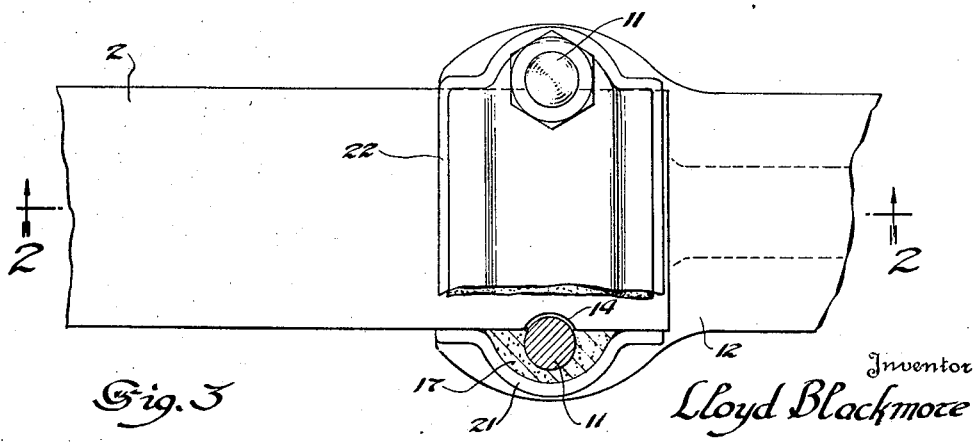
Inventor
Lloyd Blackmore Patented June 3, 1930

1,761,967

UNITED STATES PATENT OFFICE

LLOYD BLACKMORE, OF HIGHLAND PARK, MICHIGAN, ASSIGNOR TO GENERAL MOTORS RESEARCH CORPORATION, OF DETROIT, MICHIGAN, A CORPORATION OF DELAWARE

RUBBER SPRING SHACKLE

Application filed February 20, 1928. Serial No. 255,677.

This invention relates to motor vehicles, and more particularly to an improvement in shackle connections for suspending a frame upon the vehicle spring.

The invention contemplates the rigid attachment of one end of the spring with the frame, in a manner to allow free flexure thereof, and the suspension of the frame from the opposite end of the spring through the medium of a link, embodying non-metallic elastic material which is deformable to accommodate movement of the spring upon deflection. The construction is characterized by the absence of side sway, the elimination of the necessity for lubrication, the insulation of metallic parts, and the dampening of noises.

A preferred, but not necessarily the only embodiment of the invention is illustrated in the accompanying drawing in which Fig. 1 is a side elevational view, showing a vehicle frame carried by the flexible spring in accordance with the present invention; Fig. 2 is a sectional view of the suspension link at the rear end of the spring and is taken on line 2—2, of Fig. 3; Fig. 3 is a top plan view, with parts broken away, of the construction shown in Fig. 2.

Referring to the drawing, the numeral 1 indicates one of the longitudinally extending side members of a chassis frame, and 2 is a multiple leaf spring secured at an intermediate point to the vehicle axle 3 for flexibly supporting the weight of the frame on the axle. The front end of the main or long leaf of the spring 2 is rigidly connected to the chassis frame by means of a bracket 4 secured by rivets 5 to the frame member 1, and having a lateral flange or flat portion 6 curved upwardly at the rear, as at 7, and a clamping plate 8 having a downwardly curved rearward portion 9, between which plate 8 and flange 6 the front end of the spring is interposed and securely clamped by the attachment bolts 10. The oppositely curved portions 7 and 9 provide the bracket with a flaring mouth, to permit the free and easy bending or flexing of the spring end at that point, and to eliminate sharp edges.

At the rear end of the spring, a pair of suspension elements or bolts 11—11 are provided, which extend through spaced openings in the flattened portion or foot 12 of a hanger bracket 13 secured in the end of the downturned horn of the frame member 1, and on opposite sides of the main leaf of the spring 2, where they project within notches or indentations 14 formed in the side edges of the spring leaf. The bolts or studs 11 pass through and hold in place the blocks or pads 15, 16, 17 and 18 of non-metallic elastic deformable material, such as rubber or the like, which are located above the spring, below the spring, above the foot 12, and below the foot 12, respectively, and are provided with retainers or cups 19, 20, 21 and 22, for confining and limiting deformation of the elastic material.

It will be understood that the blocks or pads 15 and 18 carry the weight of the frame and are placed under compression thereby, while blocks 16 and 17 intermediate the spring and frame bracket maintain the parts in proper spaced relation and also offer a certain degree of resistance to rebound or to reaction occurring after spring deflection, whereby the spring will tend to quickly settle or return to normal relation with its associated parts.

While the invention has been described in terms that are more or less specific, it is to be understood that it is not limited to the exact details, but that such modifications may be made as come within the scope of the appended claims.

I claim:

1. Means for hanging a vehicle frame on the spring, including a block of elastic material carried on the spring, and a suspension element extending between and connecting the spring and frame, said suspension element carrying the weight of the frame and bearing on and placing said elastic block under compression.

2. A swinging shackle link for connecting a vehicle frame and spring so as to permit relative longitudinal movement therebetween, including a block of elastic material carried on the spring, a block of elastic material located below a frame part, a swinging suspension element connecting said blocks and hanging the frame on the spring thru said blocks, and an elastic element interposed between the spring and frame part affording a yielding resistance to the relative longitudinal movement between the spring and bracket.

3. In a motor vehicle, the combination with a chassis frame and a load carrying spring therefor, of means between one end of the spring and the frame affording a driving connection and a suspension link for hanging the frame from the opposite end of the spring and adapted to accommodate relative longitudinal movement between the spring and frame upon spring elongation, said suspension link including a swinging element connecting said frame and spring, a pair of compression elements of elastic material associated with said suspension element and located respectively above the spring end and below a frame part and adapted to carry the weight of the frame and to be placed under compression thereby, and a snubber element interposed between and adapted to cushion spring elongation.

4. In a motor vehicle, the combination with a chassis frame and a load carrying spring therefor, of means to rigidly connect one end of the spring with the frame, a pair of elastic blocks located above and below the opposite end of the spring, a second pair of elastic blocks located above and below a frame bracket the blocks located below the spring and above the frame being arranged back to back for deformation during relative longitudinal movement of the spring and bracket, and a pair of suspension elements on opposite sides of the spring passing thru the respective blocks and extending into notches provided in the side edges of the spring.

5. In a motor vehicle, the combination with a chassis frame and a load carrying spring therefore, of means to rigidly connect one end of the spring with the frame, a pair of elastic blocks located above and below the opposite end of the spring, a second pair of elastic blocks located above and below a frame bracket, the blocks located below the spring and above the frame being arranged back to back for deformation during relative longitudinal movement of the spring and bracket, retainer cups confining said blocks and limiting deformation thereof, and a pair of suspension elements extending thru said cups and located on opposite sides of the spring and adapted to hang the frame from the spring through the blocks located above the spring and below the bracket.

6. A swinging shackle, comprising in combination with a spring leaf having a flat end and a frame member having a flattened portion extending below and in substantial parallelism with flat spring end, of an elastic deformable element interposed between and bearing on the flat surface of the spring end and the frame member and adapted to cushion relative movement of the spring leaf and frame member toward one another, a swinging suspension member extending between and hanging the frame member upon said spring end, and elastic deformable material at opposite ends of said suspension member and between the member and both the spring end and the frame member, adapted for deformation to yieldingly carry the weight of the frame member, and to tie the spring end and frame member together so that they move toward one another during their relative longitudinal movement upon spring elongation, and which movement is cushioned by the before-mentioned elastic element.

In testimony whereof I affix my signature.

LLOYD BLACKMORE.